United States Patent
Baugh

(10) Patent No.: US 8,523,492 B2
(45) Date of Patent: Sep. 3, 2013

(54) METHOD OF INSTALLING FAIRINGS AROUND VERTICAL PIPES

(76) Inventor: Benton Frederick Baugh, Houston, TX (US)

( * ) Notice: Subject to any disclaimer, the term of this patent is extended or adjusted under 35 U.S.C. 154(b) by 1118 days.

(21) Appl. No.: 11/649,872

(22) Filed: Jan. 5, 2007

(65) Prior Publication Data

US 2008/0166185 A1    Jul. 10, 2008

(51) Int. Cl.
*F15D 1/10* (2006.01)

(52) U.S. Cl.
USPC .......................................... 405/211; 114/243

(58) Field of Classification Search
USPC .................. 114/243; 405/211–213
See application file for complete search history.

(56) References Cited

U.S. PATENT DOCUMENTS

| | | | | |
|---|---|---|---|---|
| 1,104,254 | A * | 7/1914 | Eddelbuttel-Reimers | 244/130 |
| 3,020,107 | A * | 2/1962 | Habermaas et al. | 384/549 |
| 3,899,991 | A * | 8/1975 | Chatten et al. | 114/243 |
| 4,078,605 | A * | 3/1978 | Jones | 166/359 |
| 4,112,781 | A * | 9/1978 | Baugh | 476/33 |
| 4,171,674 | A * | 10/1979 | Hale | 114/243 |
| 4,398,487 | A * | 8/1983 | Ortloff et al. | 114/243 |
| 4,474,129 | A * | 10/1984 | Watkins et al. | 114/243 |
| 5,460,463 | A * | 10/1995 | Smith | 405/212 |
| 5,722,340 | A | 3/1998 | Sweetman | |
| 5,738,034 | A | 4/1998 | Wolff | |
| 5,984,584 | A * | 11/1999 | McMillan et al. | 405/195.1 |
| 6,019,549 | A * | 2/2000 | Blair et al. | 405/216 |
| 6,048,136 | A | 4/2000 | Denison | |
| 6,401,646 | B1 | 6/2002 | Masters | |
| 6,401,825 | B1 * | 6/2002 | Woodrow | 166/350 |
| 6,575,665 | B2 | 6/2003 | Richter | |
| 6,702,026 | B2 * | 3/2004 | Allen et al. | 166/367 |
| 6,908,063 | B2 | 6/2005 | Bearman | |
| 6,928,709 | B2 | 8/2005 | McMillan | |
| 6,948,884 | B2 * | 9/2005 | Xu et al. | 405/216 |
| 7,070,361 | B2 | 7/2006 | McMillan | |
| 7,096,957 | B2 * | 8/2006 | Nish et al. | 166/367 |
| 7,108,457 | B1 * | 9/2006 | Brown et al. | 405/216 |
| 7,337,742 | B1 * | 3/2008 | Masters et al. | 114/243 |
| 2002/0146287 | A1 * | 10/2002 | Allen et al. | 405/211 |

OTHER PUBLICATIONS

U.S. Appl. No. 11/588,175.

* cited by examiner

*Primary Examiner* — Tara M. Pinnock

(57) ABSTRACT

The method of installing telescopic fairings system on a vertical pipe such as an oil or gas drilling riser to reduce the flow drag associated the vertical pipe in the currents in an ocean, including providing a rotatable interconnection between fairing sections and supporting the interconnected fairing sections independently from the vertical pipe such that the vertical pipe can be partially removed from the ocean without removing the fairings.

20 Claims, 10 Drawing Sheets

US 8,523,492 B2

METHOD OF INSTALLING FAIRINGS AROUND VERTICAL PIPES

CROSS-REFERENCE TO RELATED APPLICATIONS

N/A

STATEMENT REGARDING FEDERALLY SPONSORED RESEARCH OR DEVELOPMENT

N/A

INCORPORATION-BY-REFERENCE OF MATERIAL SUBMITTED ON A COMPACT DISK

N/A

BACKGROUND OF THE INVENTION

The field of this invention is that of installing drag reducing fairings on vertical pipes in the ocean to reduce the side load on the pipes due to ocean currents. In deepwater offshore drilling, a riser pipe of approximately 20 inch internal diameter is used for a pathway down to the well bore to allow the control of the drilling pipes and the circulating fluids. Buoyancy material is added to these pipes to offset a majority of their weight and limit the top tension required for the system. The buoyancy on a drilling riser of this type will generally be in the range of 52 inch outer diameter.

In 2.5 to 3.5 knot currents on a 5000 foot long drilling riser can incur side loadings of up to 100,000 lbs. caused by currents. These side loadings require substantial horsepower to remain above the well below for drilling while the riser pipe is connected.

During the drilling operations, a portion of the side load is taken by the vessel on the surface, and a portion of the side load is taken by the equipment on the ocean floor.

When attempts are made to retrieve the riser under these conditions, the side forces must all be taken by structures on the drilling rig at the surface. A 100,000 lb. load of the riser against the side of the rig structures will not only completely prevent the pulling of the drilling riser, but will destroy sections of the buoyancy material which impacts the rig structures.

Fairings are devices generally in the shape of an airplane wing which are pivotably mounted on a pipe such as a drilling riser. The flow around the round riser and the wing shaped trailing portion will reduce the drag on the riser by as much as 50 percent. This does not cure all of the problems, but it beneficially increases the ocean current range in which a vessel can operate.

An additional problem surrounding drilling risers is the nature of current flow down stream of the riser. In some cases it will get swirls of water called vortexes alternating on one side of the riser and then the other. In addition to the drag loads, this induces a vibration referred to as vortex induced vibration. The smooth transition from the riser pipe diameter to a fairing profile will naturally tend to reduce the potentially destructive vortex induced vibrations.

A major problem with contemporary fairing systems is that in order to be manageable, each section is about 7 feet long at a maximum. This requires a multitude of sections to be installed on a deepwater riser drilling riser. When the drilling riser is being deployed, each 7 feet, the riser must be stopped and valuable rig time allocated attaching a fairing section. In running or retrieving a drilling riser, this operation can take an additional four or five days, with ten days for a round trip. At $400,000 per day, this is as much as a $4,000,000 expense simply to attach the fairings.

As the fairings have weight and must pivot around the riser to remain down current, they must be attached to the riser in a load bearing and pivoting fashion. As they are nominally 7 feet long, this special connection must be repeated every 7 feet. This represents both the time to stop and make the connections, but also likely a modification to the buoyancy material itself to accommodate the attachment.

On a 5,000 foot drilling riser, typically only 1,000 feet of fairing would typically be installed due to the fact that the high currents tend to be near the surface. Having fairings on the upper 1,000 feet of riser will allow the operator to release from the subsea wellhead. However, in retrieving the riser the fairings must be removed. Once the first 1,000 feet of riser are retrieved, the riser will again experience the high side forces.

BRIEF SUMMARY OF THE INVENTION

The object of this invention is to provide a fairing which can be installed on a riser and remain constant at the same depth as the riser is pulled.

A second object of the present invention is to provide a fairing system which can be installed independently of running or retrieving the riser.

A third object of the present invention is to provide a connection to a current drilling riser design without requiring special modifications to the drilling riser.

Another object of this invention is to provide a fairing system which will reduce the side drag forces and vortex induced vibration.

DETAILED DESCRIPTION OF THE INVENTION

Figure 1:
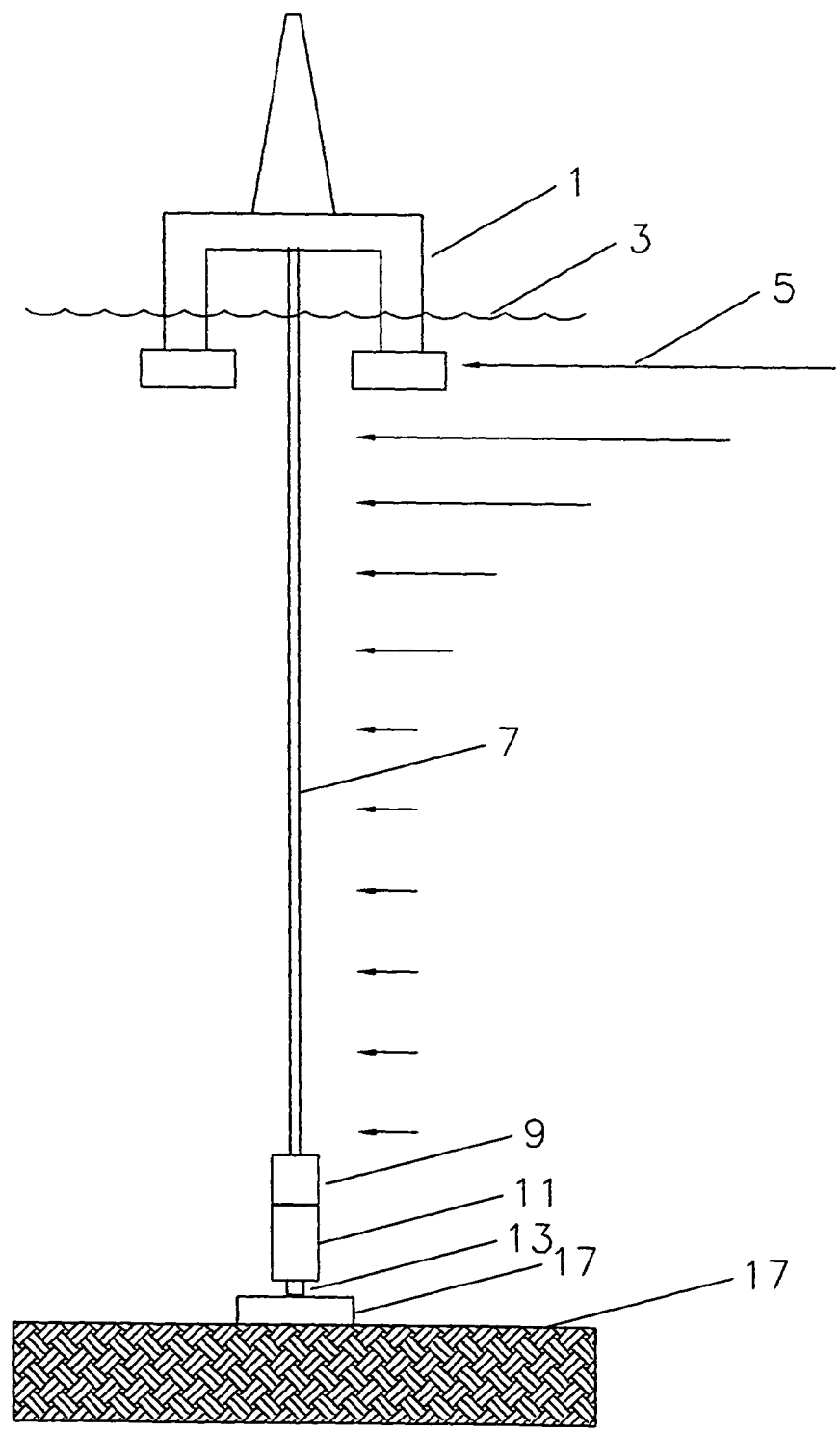
FIG. 1 is a view of an offshore drilling system with a drilling riser extending down to a blowout preventer stack connected to a wellhead on the ocean floor.

FIG. 1 shows a typical offshore deepwater drilling system with the vessel 1 at the ocean surface 3, ocean currents 5 with a profile which with higher currents near the surface and lesser currents at depths. A drilling riser 7 extends down to a lower marine riser package 9 which is landed on a lower blowout preventer stack 11, which has a connector 13 attaching to a wellhead structure 15. The sea bottom formations are shown at 17.

Figure 2:
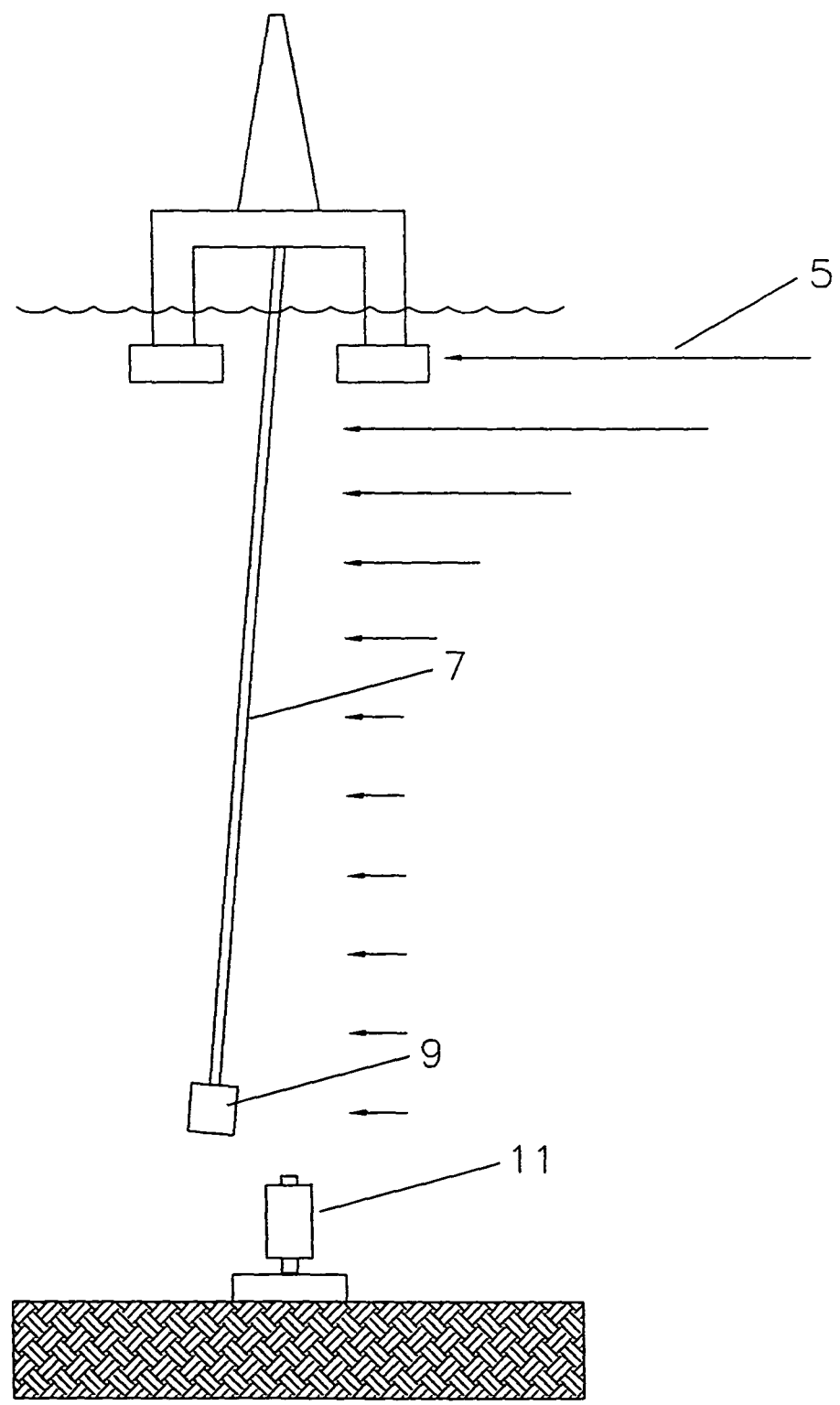
FIG. 2 is a view of an offshore drilling system with a drilling riser extending down to the upper section (the lower marine riser package) of a blowout preventer stack which has been released from the lower section of the blowout preventer stack.

FIG. 2 shows the riser system of FIG. 1 with the lower marine riser package 9 released from lower blowout preventer stack 11, resulting with the drilling riser 7 being blown downstream by the currents. In all but modest currents, this means that the drilling riser cannot be pulled back to the surface.

Figure 3:
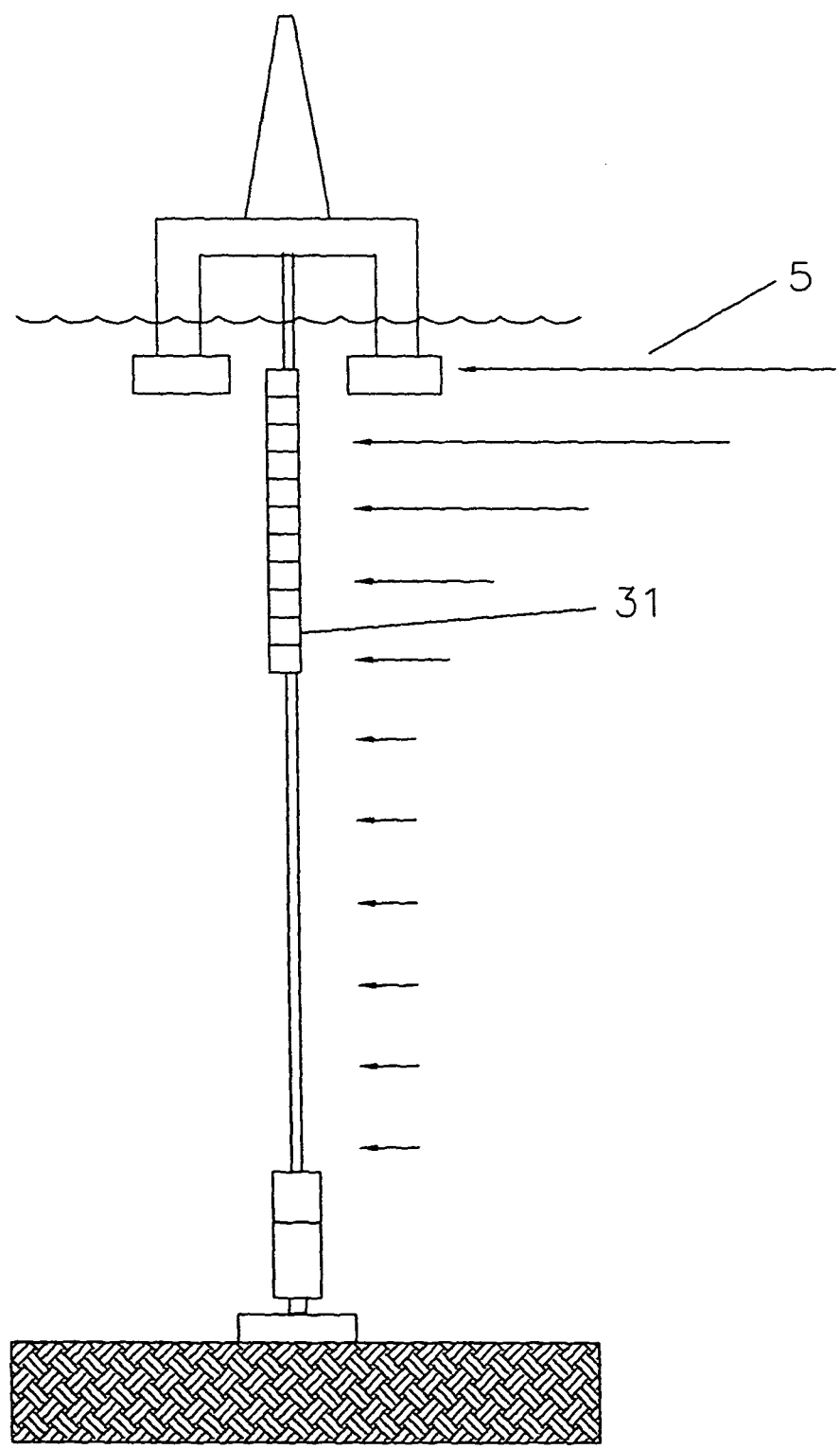
FIG. 3 is a view of the offshore drilling system similar FIG. 1 with a drilling riser extending down to a blowout preventer stack on the ocean floor and fairing added to the upper portion of the riser.

FIG. 3 shows the riser system of FIG. 1 with fairings sections 31 added to the upper portion of the riser to reduce the side loadings on the drilling riser. As it is very expensive to run the fairings, fairings are typically installed only on the upper portion.

Figure 4:
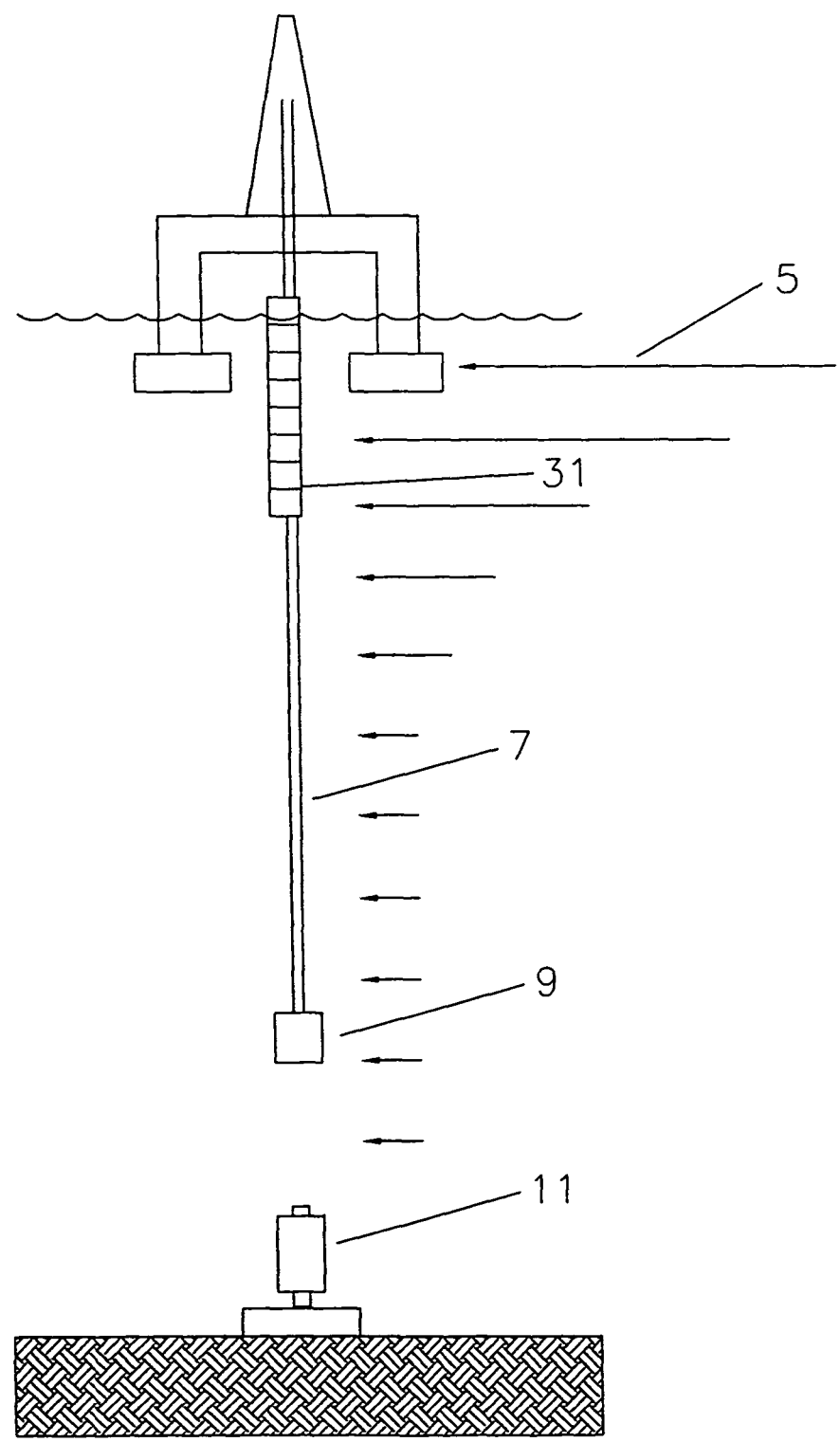
FIG. 4 is a view of an offshore drilling system with a drilling riser extending down to the upper section (lower marine riser package) of a blowout preventer stack which has been released from the lower section of the blowout preventer stack and is having the fairings removed as the riser is being retrieved.

FIG. 4 shows the riser system of FIG. 3 having been released from the lower blowout preventer stack and fairing sections 31 being removed as the riser is brought up to the surface. Although the fairing sections 31 are removed, the current profile 5 is not reduced, so the beneficial low drag effects of the fairings are lost before the riser can be retrieved to the surface.

Figure 5:
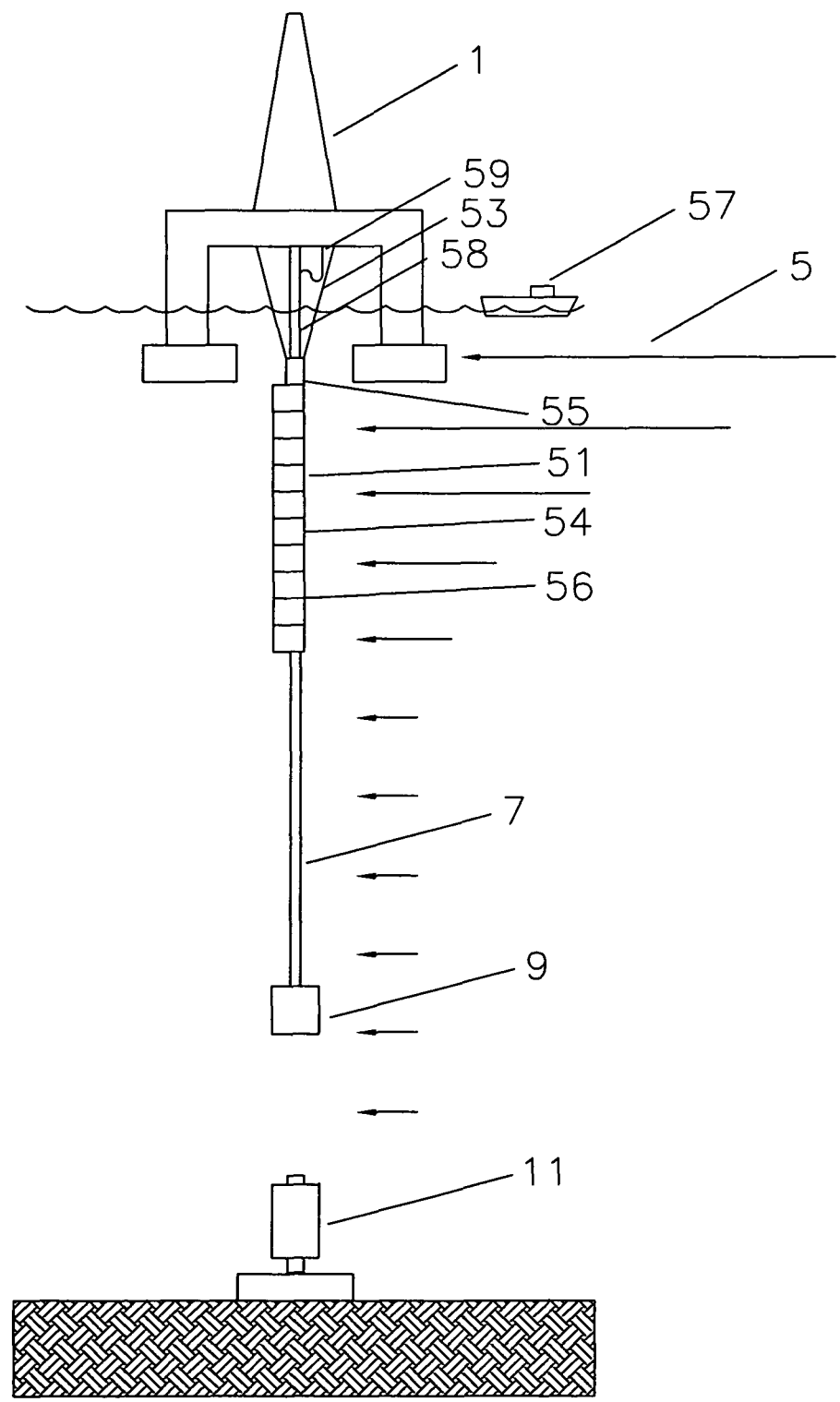
FIG. 5 is a view of an offshore drilling system with a drilling riser extending down to the upper section (lower marine riser package) of a blowout preventer stack which has been released from the lower section of the blowout preventer stack and is not raising the fairings removed as the riser is being retrieved.

FIG. 5 shows the riser system of FIG. 1 with fairings 51 independently supported from the drilling rig 1. Cables 55 are illustrated as supporting the fairings, but cylinders or other structures can be used to mechanically support the fairings 51. In this case, although the drilling riser 7 is illustrated as being released from the lower blowout preventer stack 11, all the riser can remain in place until the lower marine riser package 9 is elevated up to the bottom of the fairings 51. At any time during the pulling of the drilling riser 7, the fairings 51 can be pulled up by cables 53 or can simply be brought up by the lower marine riser package 9. Fairings 51 are made of lower sections 54 and upper section 55. Lower sections 54 are rotatably interconnected with a rotatable connection 56 and made of near neutrally buoyant material to allow for easy rotating. Upper section 55 is made of a heavy material so that it will hold tension on the cables 53 and position the lower sections 54 in the water at the desired level.

Smaller service vessel 57 might be used to install the fairings on the riser rather than being installed directly from a semi-submersible vessel as is shown at 1. This would be especially beneficial as a fully deployed riser will have equipment near the top such as a telescopic joint 58 and hose attachments 59 which make it not round as the lower portions of the riser are.

Figure 6:
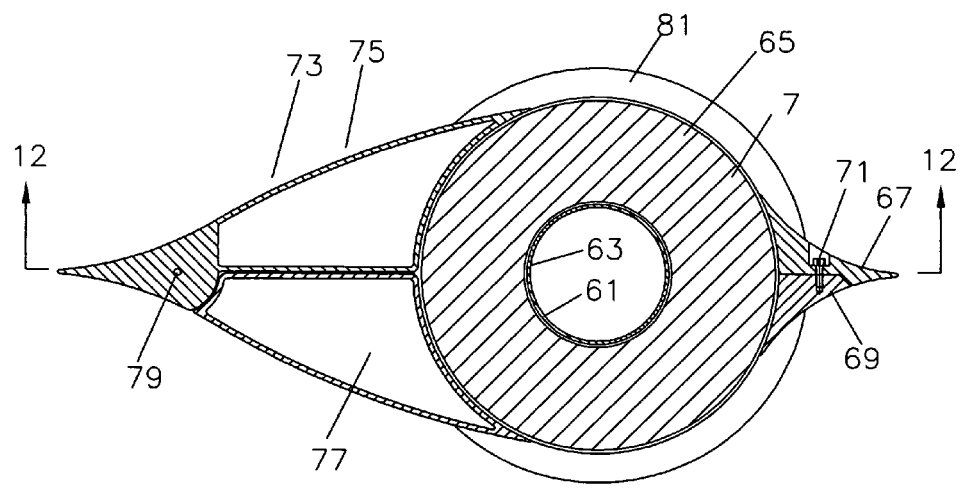
FIG. 6 is a section of the fairings showing the external profile around a joint of riser pipe.

FIG. 6 shows a cross section thru a drilling riser and a fairing showing the dominant aerodynamic profile over the length of the fairing. The inner steel riser pipe 61 has an internal diameter 63. Floatation material 65 is added to the outside of the riser. Along the length of the riser will be riser couplings (not shown) to allow the riser to be divided into sections which can be handled on the surface, usually about seventy feet long. A nose section is comprised of portions 67 and 69, along with bolts 71 which fasten them together. The rear section 73 is comprised of halves 75 and 77 which are connected by an axle 79. The front and rear sections are connected together by rings 81, which will be described later.

Figure 7:
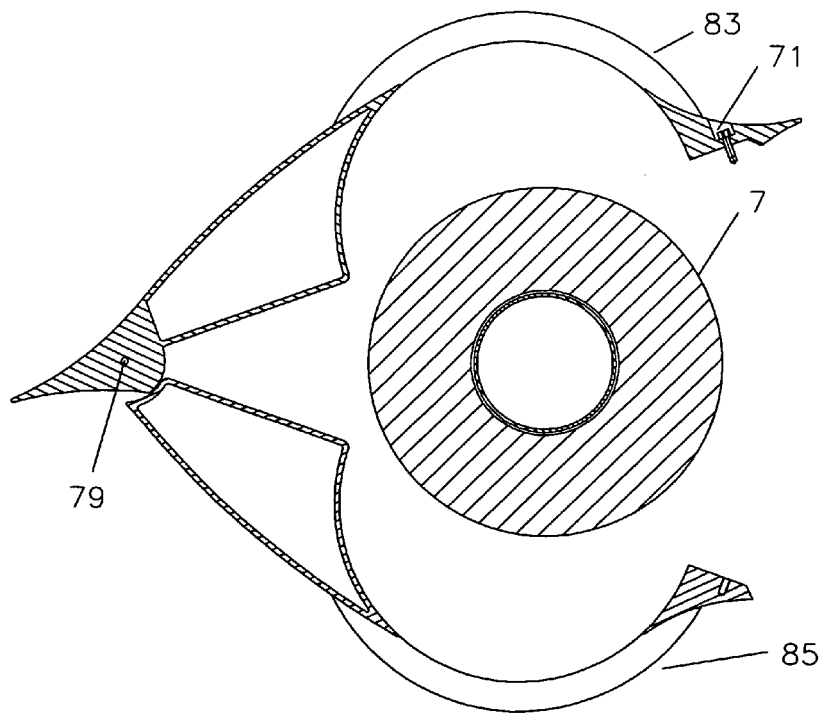
FIG. 7 is a section of the fairings showing the fairings opened to be installed on the rise pipe.

FIG. 7 shows that the bolts 71 have been released and the two halves 83 and 85 have been opened to allow installation on or removal from the drilling riser 7.

Figure 8:
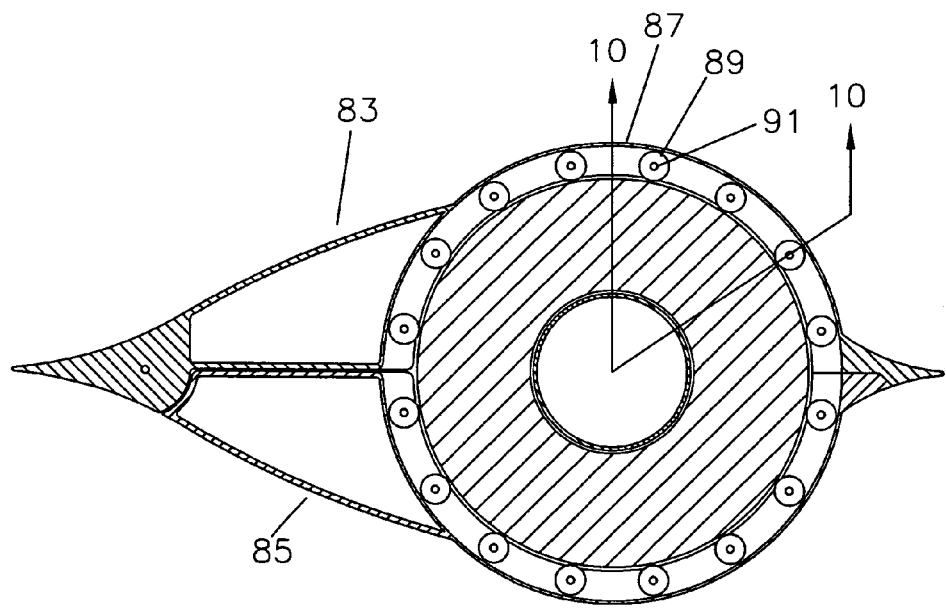
FIG. 8 is a section of the fairings showing rollers which allow the fairings to weathervane around the riser.

FIG. 8 shows a ring on the two halves 83 and 85 as discussed on FIG. 6 with ring 87 which houses a multiplicity of rollers 89 mounted on axles 91 which allow the fairing to weathervane about the riser 7 with low friction. The rollers 89 shown are indicated as simple rollers, but the preferred embodiment might be rollers such as shown in U.S. Pat. No. 4,112,781 which has wheels around the perimeter of the roller to allow low friction moving along the length of the riser pipe. This is beneficial for the running and retrieving of the fairings along the length of the riser pipe.

Figure 9:
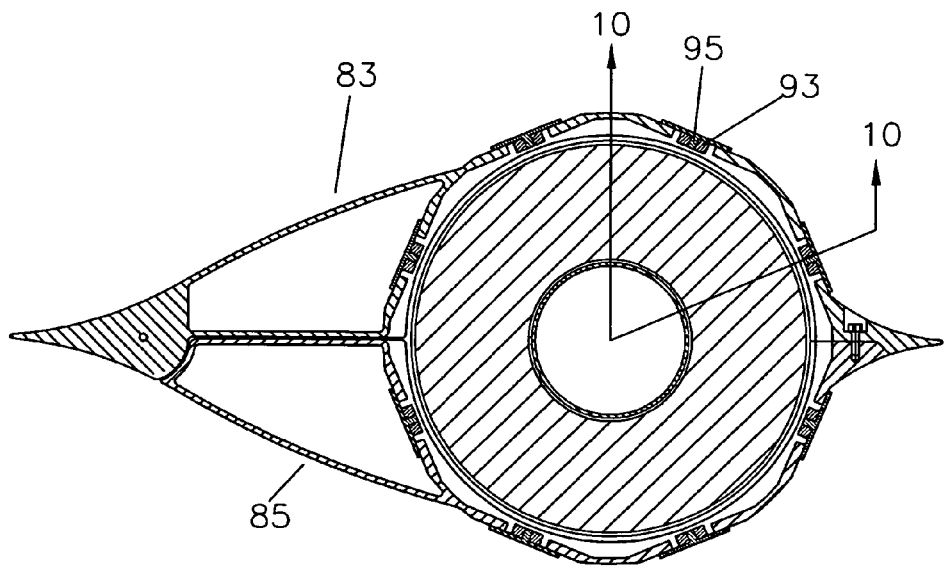
FIG. 9 is a section of the fairings showing the rollers which allow one section of fairings to support the next section of fairings.
Figure 10:
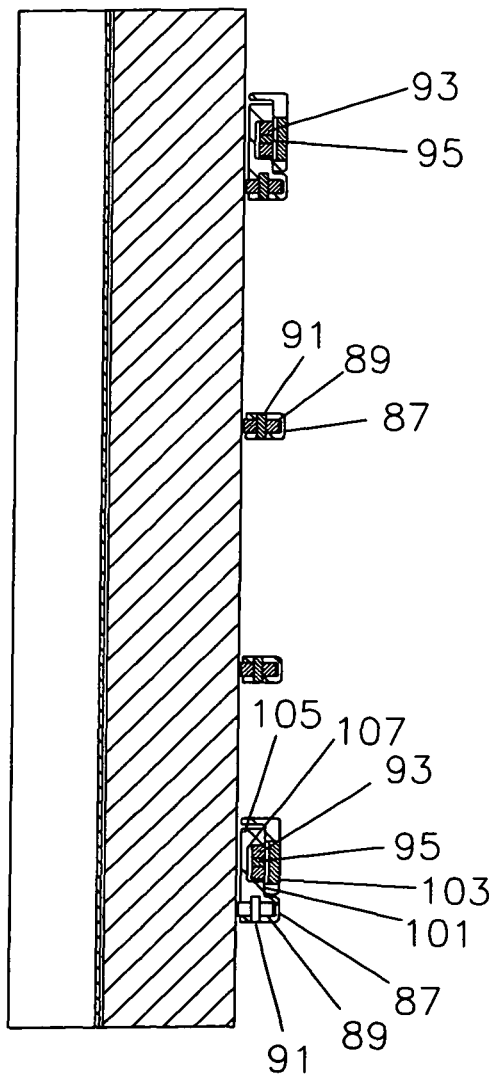
FIG. 10 is a vertical half section of the fairings taken along lines "10-10" of FIGS. 8 and 9.
Figure 11:
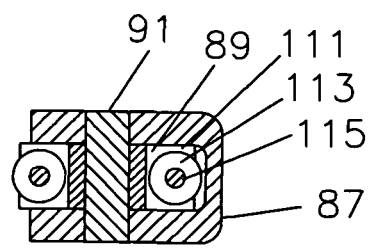
FIG. 11 is an enlargement of the rollers showing perimeter wheels.

FIG. 9 shows a multiplicity of rollers 93 about axles 95 which act as a rotatable connection between adjacent sections of fairing, as will be seen in FIGS. 10 and 11.

FIG. 10 shows a half section showing ring 87 which houses rollers 89 about axles 91. This combination of rollers and axles is repeated four times along the length of the fairing for support along the riser pipe, especially over interruptions in the riser floatation material which occurs at connections. Also seen are rollers 93 on axles 95 which are mounted on the inside 101 of the lower end 103 of each fairing section. The upper end 105 provides a groove 107 which is engaged by the rollers from the section fairing above to interconnect the fairings. This method provides for both connection and rotatability.

FIG. 11 shows a larger view of the area of the ring 87 with rollers 89, showing a multiplicity of slots 111 cut across the roller 89 around the perimeter and wheels 113 on axles 115 inserted into the slots. This allows rolling movement along the riser using the small perimeter wheels 115, while the main roller 89 provides rotation about the riser.

Figure 12:
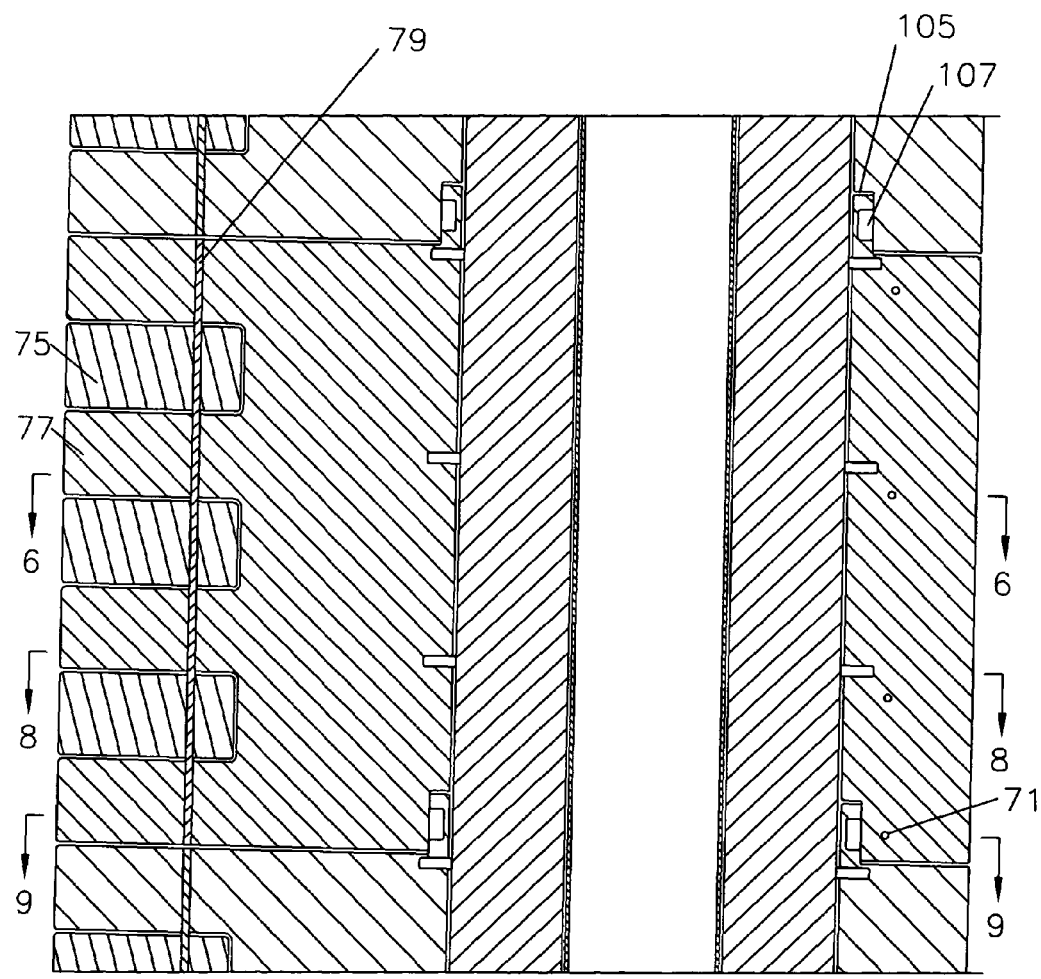
FIG. 12 is a vertical section of the fairings taken along lines "12-12" of FIG. 6.

FIG. 12 shows a section of the fairing and riser taken at lines "11-11" on FIG. 6 and illustrates the interlocking of the rear sections 75 and 77 with axle 79 to allow the unit to be opened like a hinge.

Figure 13:
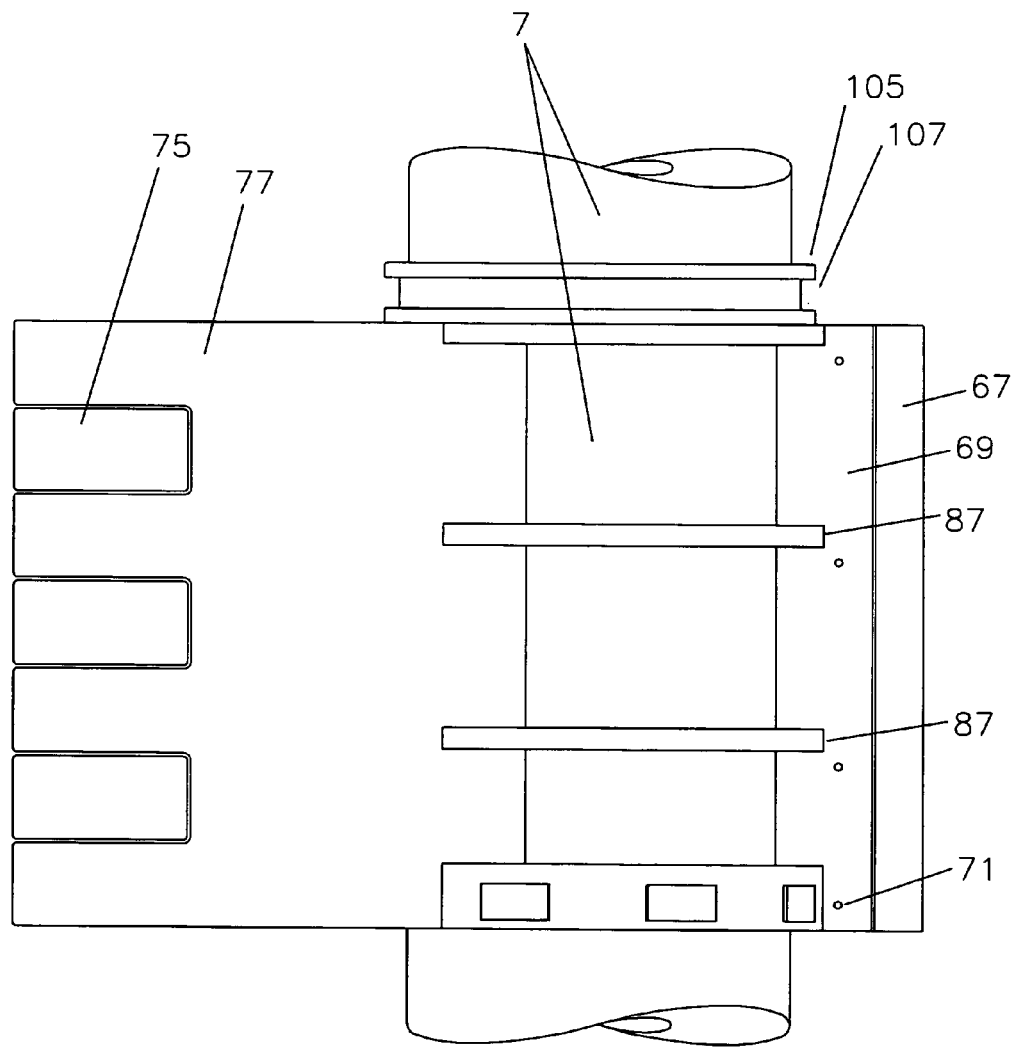
FIG. 13 is a view of one section of the fairings surrounding a riser pipe.

FIG. 13 shows a section of the fairing surround a drilling riser 7, upper groove 105, rings 87 which house rollers 89 and connect the front sections 67 and 69 to the rear sections 75 and 77, and a lower end 103.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. The method of installing fairings on a vertical pipe to reduce the fluid flow drag associated with said vertical pipe in the currents in an ocean, comprising:
   providing a multiplicity of fairing sections,
   providing a rotatable connection between said fairing sections, and supporting said connected fairing sections independently supported and axially slidable of said vertical pipe.

2. The method of claim 1, further comprising said fairing sections having a pivot which allows said fairing sections to open to be installed on said vertical pipe.

3. The method of claim 2, further comprising when said fairings sections close about said pivot said fairing section locks into a groove on an adjacent lower fairing section to rotatably support said lower fairing section.

4. The method of claim 3, further comprising locking into said groove with wheels.

5. The method of claim 4, further comprising the step of providing a multiplicity of smaller wheels mounted around the perimeter of said wheel to allow rolling at a right angle to the axis of said wheel.

6. The method of claim 1, further comprising the upper of said fairing sections is negatively buoyant.

7. The method of claim 1, further comprising the majority of said fairing sections below said upper of said fairing sections are near neutrally buoyant.

8. The method of claim 1, further comprising fixing said vertical pipe in said ocean, installing said fairing sections on said vertical pipe, and lowering said fairing sections into said ocean.

9. The method of claim 1, further comprising removing said fairing sections while said vertical pipe is fixed in place in said ocean by pulling said fairing sections upwards along said vertical pipe.

10. The method of claim 1, further comprising said vertical pipe is supported by a first vessel and said fairing sections are installed on said vertical pipe from a second vessel.

11. The method of installing fairing sections on a vertical pipe to reduce the fluid flow drag associated with said vertical pipe in the currents in an ocean, comprising providing a multiplicity of fairing sections, providing a rotatable connection between said fairing sections, supporting said connected fairing sections independently supported and axially slidable of said vertical pipe, such that said vertical pipe can be partially removed from said ocean without raising said fairings.

12. The method of claim 11, further comprising said fairing sections having a pivot which allows said fairing sections to open to be installed on said vertical pipe.

13. The method of claim 12, further comprising when said fairings sections close about said pivot said fairing section locks into a groove on an adjacent fairing section to rotatably support said lower fairing.

14. The method of claim 13, further comprising locking into said groove with wheels.

15. The method of claim 14, further comprising said wheels have a multiplicity of smaller wheels mounted around the perimeter of said wheel to allow rolling at a right angle to the axis of said wheel.

16. The method of claim 11, further comprising the upper of said fairing sections is negatively buoyant.

17. The method of claim 11, further comprising the majority of said fairing sections below said upper of said fairing sections are near neutrally buoyant.

18. The method of claim 11, further comprising said vertical pipe is a drilling riser.

19. The method of claim 11, further comprising fixing said vertical pipe in said ocean, then installing said fairing sections on said vertical pipe, and then lowering said fairing sections into said ocean.

20. The method of claim 11, further comprising raising said fairing sections along said vertical pipe for removing said fairing sections while said vertical pipe is fixed in place in said ocean.

\* \* \* \* \*